US012100250B2

(12) United States Patent
Parsadayan et al.

(10) Patent No.: US 12,100,250 B2
(45) Date of Patent: Sep. 24, 2024

(54) REMOTE ACCESS MANAGEMENT APPARATUS, SYSTEM AND METHOD

(71) Applicant: MAXIMUM CONTROLS, LLC, Fountina Valley, CA (US)

(72) Inventors: Alex Parsadayan, Fountain Valley, CA (US); Hagop Sakadjian, Fountain Valley, CA (US)

(73) Assignee: Maximum Controls, LLC, Fountain Valley, CA (US)

( * ) Notice: Subject to any disclaimer, the term of this patent is extended or adjusted under 35 U.S.C. 154(b) by 0 days.

(21) Appl. No.: 17/110,573

(22) Filed: Dec. 3, 2020

(65) Prior Publication Data

US 2023/0410579 A1 Dec. 21, 2023

Related U.S. Application Data

(60) Provisional application No. 63/111,520, filed on Nov. 9, 2020.

(51) Int. Cl.
*G07C 9/00* (2020.01)

(52) U.S. Cl.
CPC ..... *G07C 9/00182* (2013.01); *G07C 9/00817* (2013.01)

(58) Field of Classification Search
CPC ........................ G07C 9/00182; G07C 9/00817
See application file for complete search history.

(56) References Cited

U.S. PATENT DOCUMENTS

| | | | | |
|---|---|---|---|---|
| 9,640,002 | B1 | 5/2017 | Grosberg | |
| 10,134,212 | B1 * | 11/2018 | Ren | G07C 9/00896 |
| 10,360,363 | B1 | 7/2019 | Grosberg | |
| 2012/0268243 | A1 * | 10/2012 | Kappeler | G07C 9/22 340/5.61 |
| 2013/0214898 | A1 * | 8/2013 | Pineau | H04L 63/101 340/5.6 |
| 2014/0375422 | A1 * | 12/2014 | Huber | G07C 9/00571 340/5.61 |
| 2019/0130689 | A1 * | 5/2019 | Baumgarte | H04L 9/3226 |
| 2020/0327757 | A1 * | 10/2020 | Kelley | G07C 9/00182 |
| 2020/0402334 | A1 * | 12/2020 | Conrad | H04W 12/06 |
| 2021/0209876 | A1 * | 7/2021 | Jiang | G07C 9/00309 |

* cited by examiner

*Primary Examiner* — Nabil H Syed
(74) *Attorney, Agent, or Firm* — One LLP

(57) ABSTRACT

A remote access control apparatus includes features for controlling an electro-mechanical actuator for locking or unlocking a door or gate mechanism in response to a signal from a wireless interface. The signal is generated by an application in communication with the access control apparatus via a wide area network or other electronic communication network. A managing user configures access for a guest via an online interface, which generates an executable addressed resource specifying conditions for entry. The managing user can grant access by enabling distribution of a link to the resource, which verifies the identity of the requesting device or user and transmits an access command to the lock controller if the request meets the user-specified conditions.

18 Claims, 14 Drawing Sheets

800

802

900

950

1900

2000

REMOTE ACCESS MANAGEMENT APPARATUS, SYSTEM AND METHOD

RELATED APPLICATIONS

The present application claims benefit of U.S. Provisional Patent Application Ser. No. 63/111,520 filed Nov. 9, 2020.

FIELD

The present application relates to remote access control devices, and more particularly to keypad devices and methods for remote entry to locked facilities.

BACKGROUND

To gain access to a residential or commercial property, there is usually a telephone entry system that allows visitors to call the property manager or owner and engage in an audio communication via a land line or cellular service. This land line or cell service requires paying a monthly fee. In addition, granting entry by telephone requires participation by the resident, who may wish to admit a guest when the resident is not home. Such systems do not allow convenient entry of guests when the resident is not available to answer a call from the telephone entry system.

To provide a guest access to a residential or commercial facility, a resident or manager may issue a credential such as a radio transmitter, keycode (to be entered on a keypad), or a keycard, to each guest, to be returned when the visit is over. These credentials require cumbersome physical tracking and management. In addition, such credentials are expensive and require expensive access control devices such as radio receivers, keypads, or card readers to be installed at the facility to receive or detect the credential and allow each guest access. Access control devices are often vandalized requiring costly maintenance.

It would be desirable, therefore, to develop new methods and other new technologies for remote access management that overcome these and other limitations of the prior art

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for controlling remote access to a physical facility gated by an electro-mechanical lock may include receiving, by at least one processor over a computer network, instructions from a user specifying a lock controller identifier, a time period for which access is granted, and at least one authorized client device identifier. The method may further include providing, by the at least one processor, an online executable code for managing temporary access to the physical facility, based on the instructions, in a network-accessible memory location. The method may further include providing, by the at least one processor to an electronic address specified by the user, a unique link to the online executable code.

Thereafter, the user can provide the link to the guest or guests, each of which can access the online executable code via a web browser operating on a smartphone or the like. When at the facility gate, the guest requests access to the gate via the link, which connects to executable code hosted by a computer on the Internet or equivalent computer network. The executable code authenticates the guest identity and permitted times of access. If the request meets all access criteria, the online executable code causes an access command (e.g., command to unlock and/or open) to be sent to the electromechanical lock via a network interface. The network interface, also called a "hub" herein, may be a modular electronic unit that can be connected to any electromechanical lock having a serial port, or equivalent input/output port.

In related aspects, the method may further include receiving, from a requesting device via the unique link, a request for access to the physical facility. As noted above, this operation may be performed by executable code hosted on the Internet or the like. In a related aspect, the method may include comparing a client identifier originating from the requesting device to the at least one authorized client identifier, and transmitting a command to a control circuit that actuates an unlocking mechanism only if the request meets a predetermined condition. The predetermined condition may include any suitable identity or time constraints. For example, the predetermined condition may require one or more of the client identifier originating from the requesting device matching the at least one authorized client identifier, or a time at which the apparatus receives the request for access is within the time period for which access is granted. In some embodiments, the at least one authorized client identifier may be, or may include, an electronic address for an authorized client device, for example, a unique telephone number or Internet address. In addition, or in an alternative, the at least one authorized client identifier may be, or may include, a password or electronic identity token, with or without an account identifier.

In another aspect, the method may include transmitting the command to a cellular network transceiver (e.g., the hub) coupled to a controller of the electro-mechanical lock. The method may include receiving data from the controller of the electro-mechanical lock via the cellular network transceiver. Thus, for example, a user may be able to check operational status of the electro-mechanical lock controller without a visit to the physical facility.

In another aspect, the method may include authenticating the remote user who sets up the guest pass online, for example, using a username and password, with or without 2-factor authentication. Authentication should be secure enough to prevent issuance of unauthorized guest passes. In addition, users should be able to cancel or amend guest passes, for example by changing the access period or adding/removing guest users. Accordingly, the method may include updating at least one of the lock controller identifier, the time period for which access is granted, or the at least one authorized client identifier, in response to a request from the user.

In related aspects, an apparatus for remote access to a physical facility gated by an electro-mechanical lock may include a network interface and at least one processor coupled to a memory and to the network interface, wherein the memory holds program instructions that when executed by the at least one processor, cause the apparatus to perform operations of the methods described herein. The apparatus may be, or may include, a networked computer server. A wireless communication hub coupled to a controller for the electro-mechanical lock for physically unlocking and/or opening access to the physical facility may, together with the computer server, make up a system for providing temporary access to a physical facility. Such a system may further include one or more client devices, for example, a guest's smartphone and a personal computer or smartphone used by the owner, resident or property manager to configure each guest pass generated by the server.

In other aspects of the disclosure, a remote access control apparatus includes features for controlling an electro-mechanical actuator for locking or unlocking a door mechanism in response to a signal from a wireless interface. The signal is generated by an application in communication with the access control apparatus via a wide area network or other electronic communication network. The access control apparatus lacks functionality for alerting a user of the application when access is requested. Instead, the person requesting access does so using a communication method and channel independent of the apparatus, for example, a telephone call, or connecting to a computer server.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 13 is a flow chart with exemplary screenshots showing aspects of a method for assigning or amending an identifier for a controller for an electro-mechanical lock, for use with a guest pass or the like.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are shown in block diagram form to facilitate describing these aspects.

Figure 1:
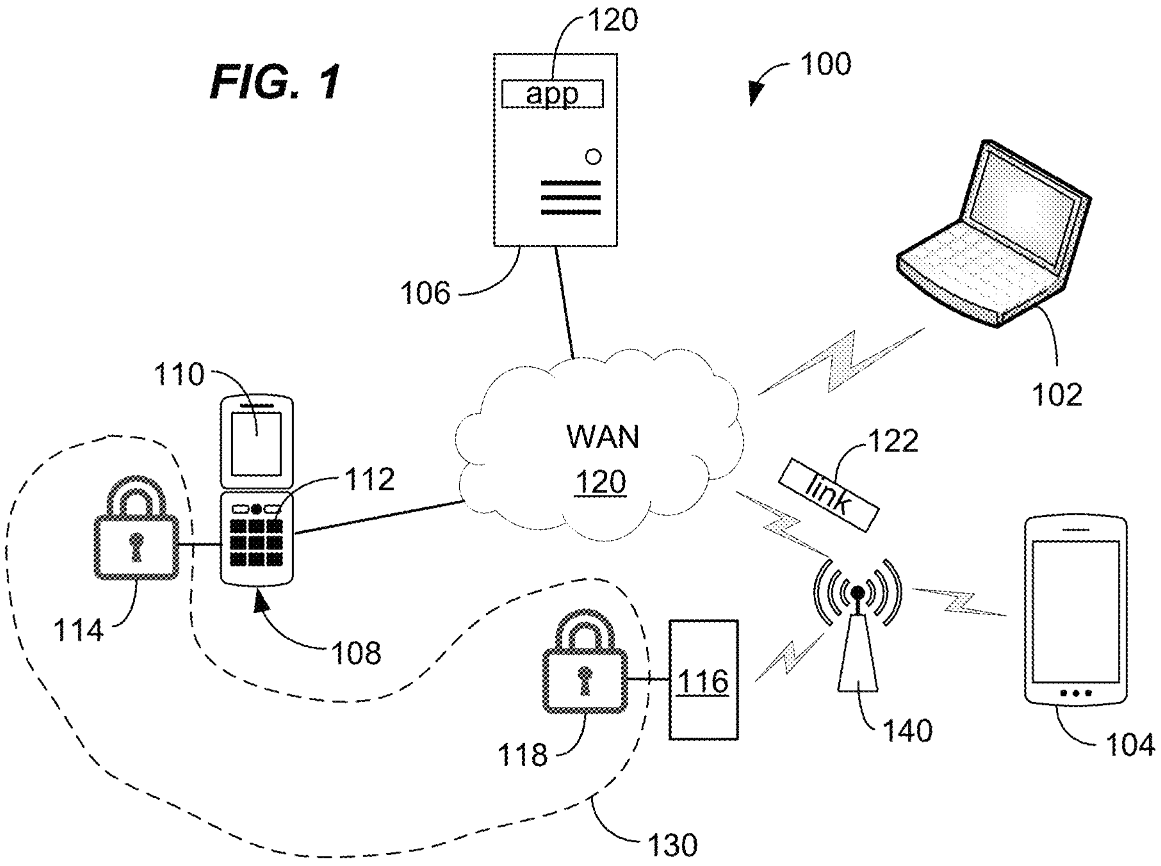
FIG. 1 is a diagram illustrating a system and apparatus for remote access to a physical facility gated by an electro-mechanical lock.

FIG. 1 shows elements of a system 100 and apparatus 106 for remote access to a physical facility 130 gated by an electro-mechanical lock 114, 118. The electro-mechanical lock 114, 118 may be, for example, a swinging or sliding motor-driven gate opener, or a solenoid-operated lock for a door. As used herein, a "physical facility" means an enclosed area that is accessed through a door, gate, or the like. The electro-mechanical lock 114 is coupled to a keypad controller 108 that includes a keypad 112 and display 110. The electro-mechanical lock 118 is coupled to a hub 116 that may be coupled to a wide area network (WAN) 120 (e.g., the Internet) via one or more nodes 140 of a cellular telephony or other wireless network. In an alternative, or in addition, the keypad controller 108 and/or hub 116 may be coupled to the WAN 120 via a wired or wireless router/modem (not shown).

The system 100 may further include a web server 106 holding in a memory coupled thereto a web application 121, or several such applications, for guest pass operation and control. The web server 106 may be of any suitable form or architecture for hosting web pages, for example, a stand-alone server, a server farm, a cloud server, or a peer-to-peer server. The web application may be coded in any suitable server-side application, for example, PHP, Python, Ruby, C#, or NodeJS(JavaScript). In an alternative, or in addition, one or more functions of the application 121 may be coded in a client side code language. In either case, the application 121 is an instance of non-transitory code that when executed by one or more processors of the server 106, a participating one of the clients 102, 104, the keypad controller 108, and/or the hub 116, causes the system 100 and/or one or more programmable apparatus therein (e.g., the server 106) to perform operations of methods as described herein.

In an aspect, a user having administrative authority for the physical facility 130 and electro-mechanical locks 114, 118 may connect to the server 106 via a first client 102 and WAN 120, for example, using a web page to log into a website hosted by the server and accessing the application 121 by selecting one or more pages or other objects included in the website. Although the first client 102 is pictured as a laptop computer, it may be in any useful form, for example, a personal computer, notepad computer, smart phone, or virtual reality gear. The user configures a guest pass for a guest using a second client 104, for example a smartphone or other suitable client device. Using parameters specified the authorized user, the server 10 provisions the application 121 in a network-accessible memory and sends a link 122 to one or more client devices 104 specified by the authorized user, for example by including the link in an SMS message sent to a designated phone number.

The guest may receive such link 122 using the client device 104 and save the link in a memory thereof. When located at the gate of the facility 130 the user activates the link 122, which opens the guest pass application 121 on the server 106. The application authenticates the client device 104 by its mobile subscription identification number (MSIN) or other unique identifier. In some embodiments, the application 121 may use additional or alternative authentication techniques, such as, for example, biometric identity data, passwords, or a second communication channel. If the device and user are authenticated for the guest pass and the current time is within the active period for the pass, the server 106 may send a data signal via the WAN 120 and cellular network 140 to the hub 116 and/or keypad controller 108. The data signal may include a command to open the lock 118, 114.

To prevent inadvertent opening of the lock 118, 114 when the client device is far away, the server 106 may verify that the client device is located near the electro-mechanical lock 118 (or lock 114, as the case may be) using a triangulation protocol (e.g., GPS) or other locating method, before sending the open command to the hub 116 or keypad controller 108. In an alternative, or in addition, the hub 116 or keypad controller 108 may sense proximity of the client device. In the case of the keypad controller 108, the server 106 may transmit a temporary passcode to the client device or to the display 110 of the controller 108 for the guest to manually enter using the keypad 112 or other suitable user interface. The hub 116, however, has no user interface for the guest, so proximity detection may be performed using an automatic locating method or proximity sensing as known in the art. Thus, a user 102 of the first client device 102 may provision a guest pass for the guest having the second client 104 without needing to supply an access token or key to the guest. Further, the hub 116 or keypad controller 108 may report access events to confirm successful use of the guest pass, if desired.

Figure 2:
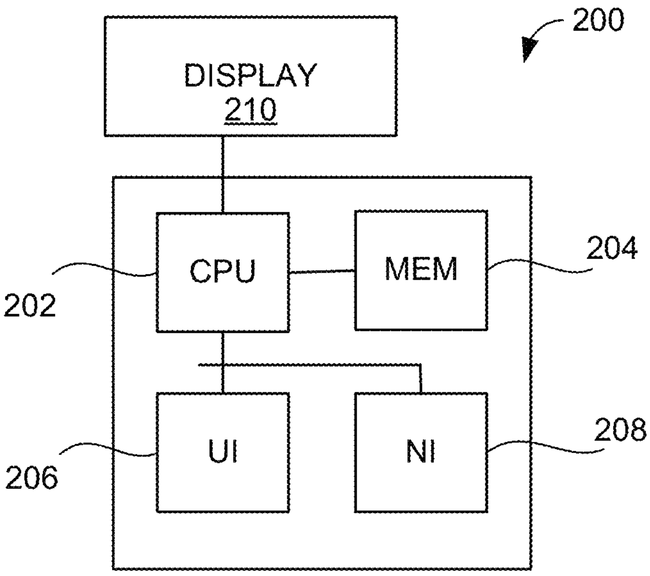
FIG. 2 is a diagram illustrating an apparatus for remote access control to a physical facility gated by an electro-mechanical lock.

FIG. 2 shows an apparatus 200 for remote access control to a physical facility gated by an electro-mechanical lock. The apparatus 200 may be configured as the server 106, keypad controller 108 and/or client device 104 of system 100, for example. In any case the apparatus 200 includes at least one processor 202 coupled to a memory 204 holding program instructions, that when executed by the processor causes the apparatus 200 to perform methods as described herein. The processor 202 may be coupled to a network interface for sending and receiving data to other network nodes, for example, between the server 106, client devices 102, 104, and hub 116 or keypad controller 108.

If configured as a server or as the hub 116, the user interface 206 and display 210 may be omitted from the apparatus 200 and provided instead by a connected client device. If configured as a keypad controller 108 or client device 102, 104, the display 210 and user interface 206 (e.g., keypad, touchscreen, or microphone) may be built into the apparatus 200.

Figure 3:
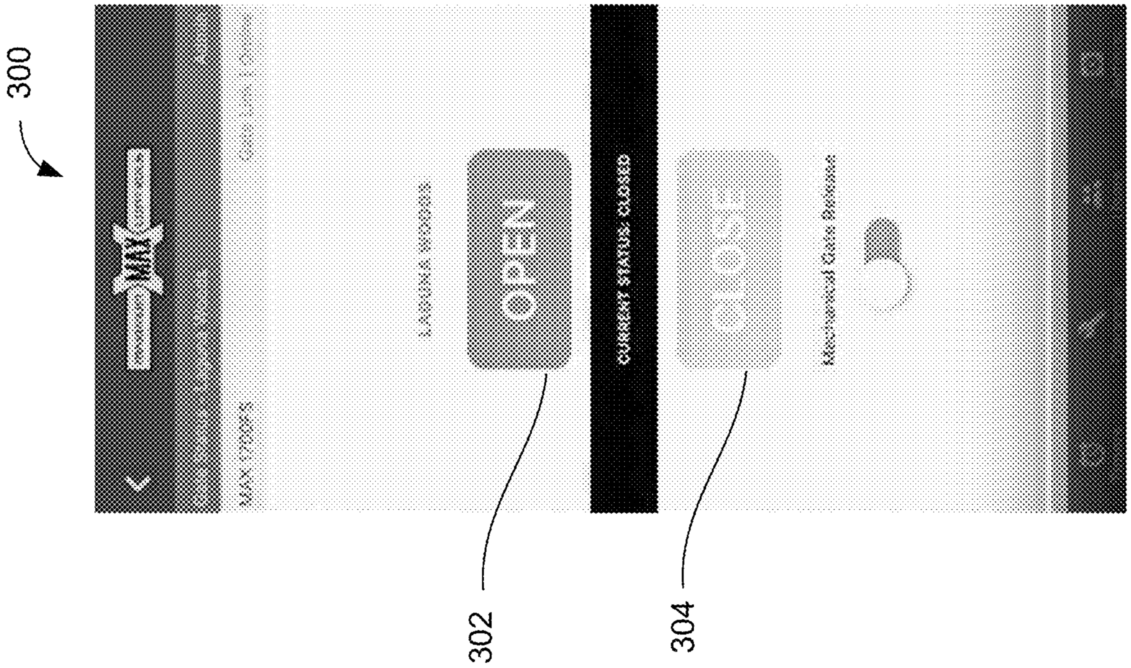
FIG. 3 is a screen shot showing an example of a browser application user interface for controlling operation of an electro-mechanical lock.

FIG. 3 shows an example of a browser application user interface object 300 for controlling operation of an electro-mechanical lock. The interface object 300 may be served by a server 106 as shown in FIG. 1 to the first client device for an administrative user to open the specified electro-mechanical lock, in the illustrated example, "Laguna Woods." This may be useful for manual unlocking for one-time admission of a guest who is in contact with the administrative user by phone, for example. By activating the "open" object 302, the user may cause the server to send an "open" command to a hub or keypad controller controlling the "Laguna Woods" gate. Similarly, the "close" object may be used to cause the server to send a close command. The interface 300 may have a similar appearance and function for a guest, wherein operability of the interface is subject to the guest pass parameters set up by the administrative user for the guest.

Figure 4:
FIG. 4 is a screen shot showing an example of a browser application user interface for configuring or viewing a user list.

FIG. 4 shows an example of a browser application user interface 400 for configuring or viewing a user list 402. The user interface 400 is for administrative users to set up authorized users and guests for a specified electro-mechanical lock, and may be served by the server 106 to a first client 102.

Figure 5:
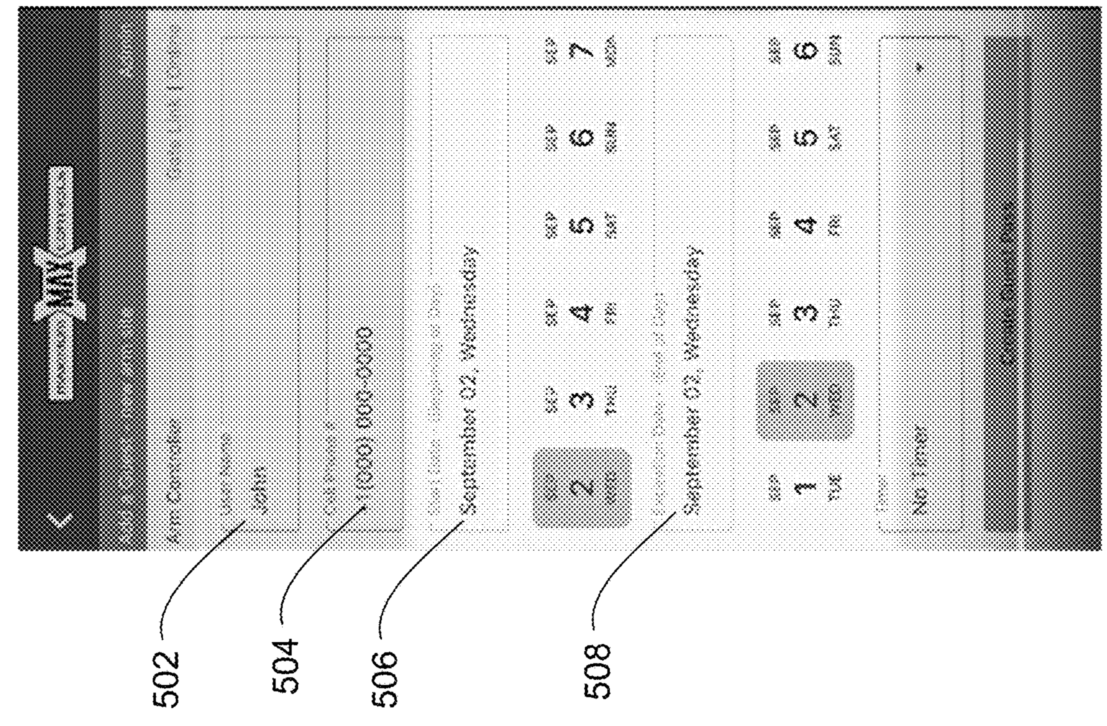
FIG. 5 is a screen shot showing an example of a browser application user interface for configuring a guest pass.

FIG. 5 shows an example of a browser application user interface 500 for configuring a guest pass, for an administrative user to configure parameters of a guest pass. The user interface 500 may include form fields 502 for setting up a guest name, 502 for setting up the phone number of the client device that the guest will use for access, a start date/time field 506 for setting up the start of the access period, and an end date/time field 508 for similarly specifying an end of the active guest period. By selecting the "create guest pass" object at the bottom of the interface 500, the user causes the guest parameters to be sent to the server for use in controlling guest access.

Figure 6:
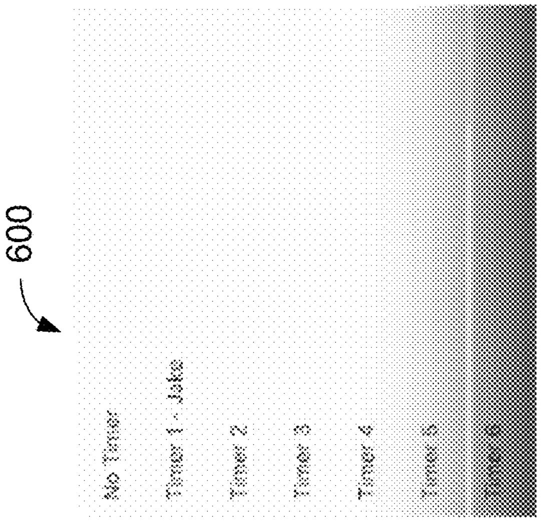
FIG. 6 is a screen shot showing an example of a browser application user interface for selecting timer settings.

FIG. 6 shows an example of a browser application user interface 600 for selecting timer settings. The administrative user can pick a timer to apply to one or more guest passes. Selecting a timer opens another user input screen for the administrative user to set additional conditions for guest entry, for example, day-of-week or time-of-day restrictions. The server will further limit entry times based on the additional restrictions.

Figure 7:
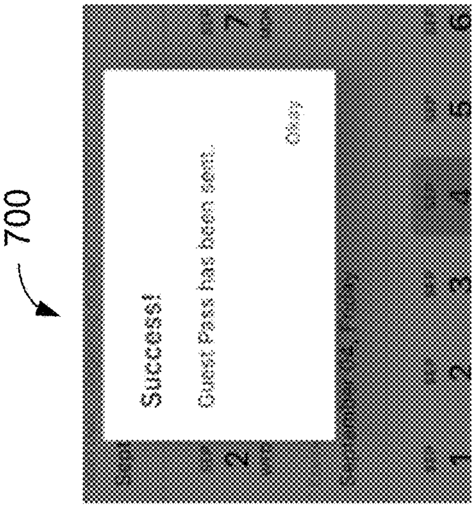
FIG. 7 is a screen shot showing an example of a browser application user interface for providing a status message.
Figure 8:
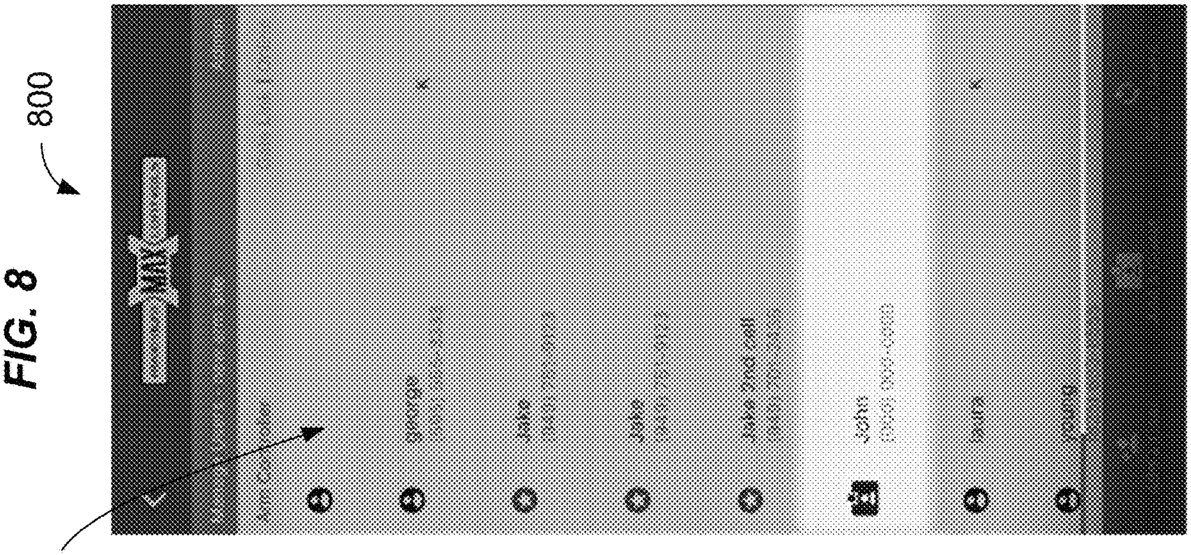
FIG. 8 is a screen shot showing an example of a browser application user interface for managing users, showing addition of a guest user.
Figure 9A:
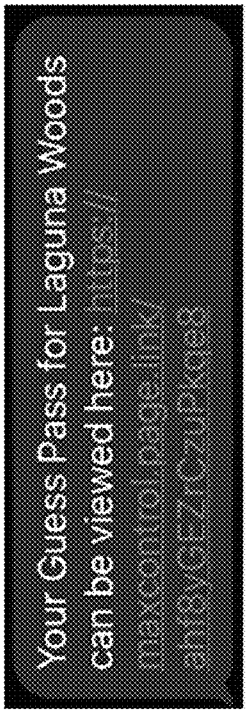
FIG. 9A shows an example of a message reporting transmission of a guest pass with a link to a control page for the guest pass.
Figure 9B:
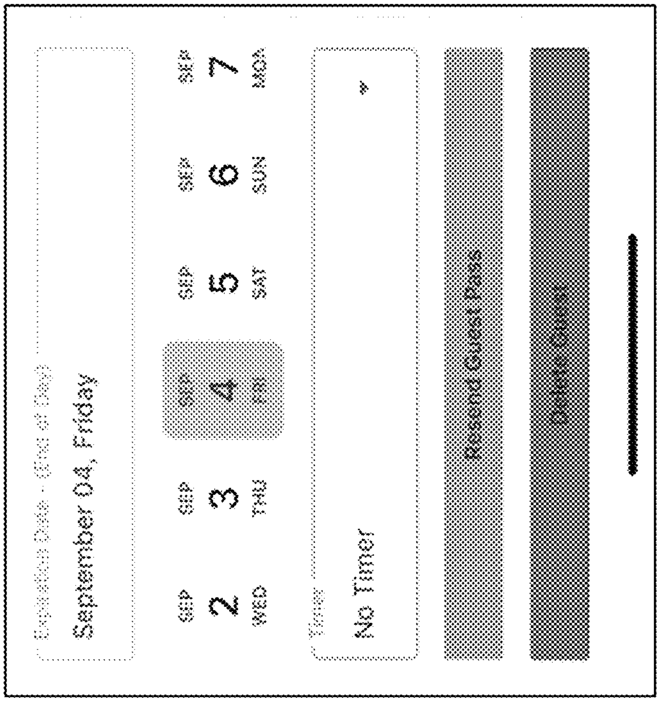
FIG. 9B shows an example of a browser application user interface for amending a guest pass.

FIG. 7 shows an example of a browser application user interface 700 for providing a status message confirming that the server has received the guest pass parameters from the client device. FIG. 8 shows an example of a browser application user interface 800 for managing user, showing addition of a guest user "John" with a guest icon to distinguish from regular users. FIG. 9A shows an example of a message 900 reporting transmission of a guest pass with a URL link to a control page for the guest pass. FIG. 9B shows an example of a browser application user interface 950 for amending a guest pass that is already issued.

Figure 10:
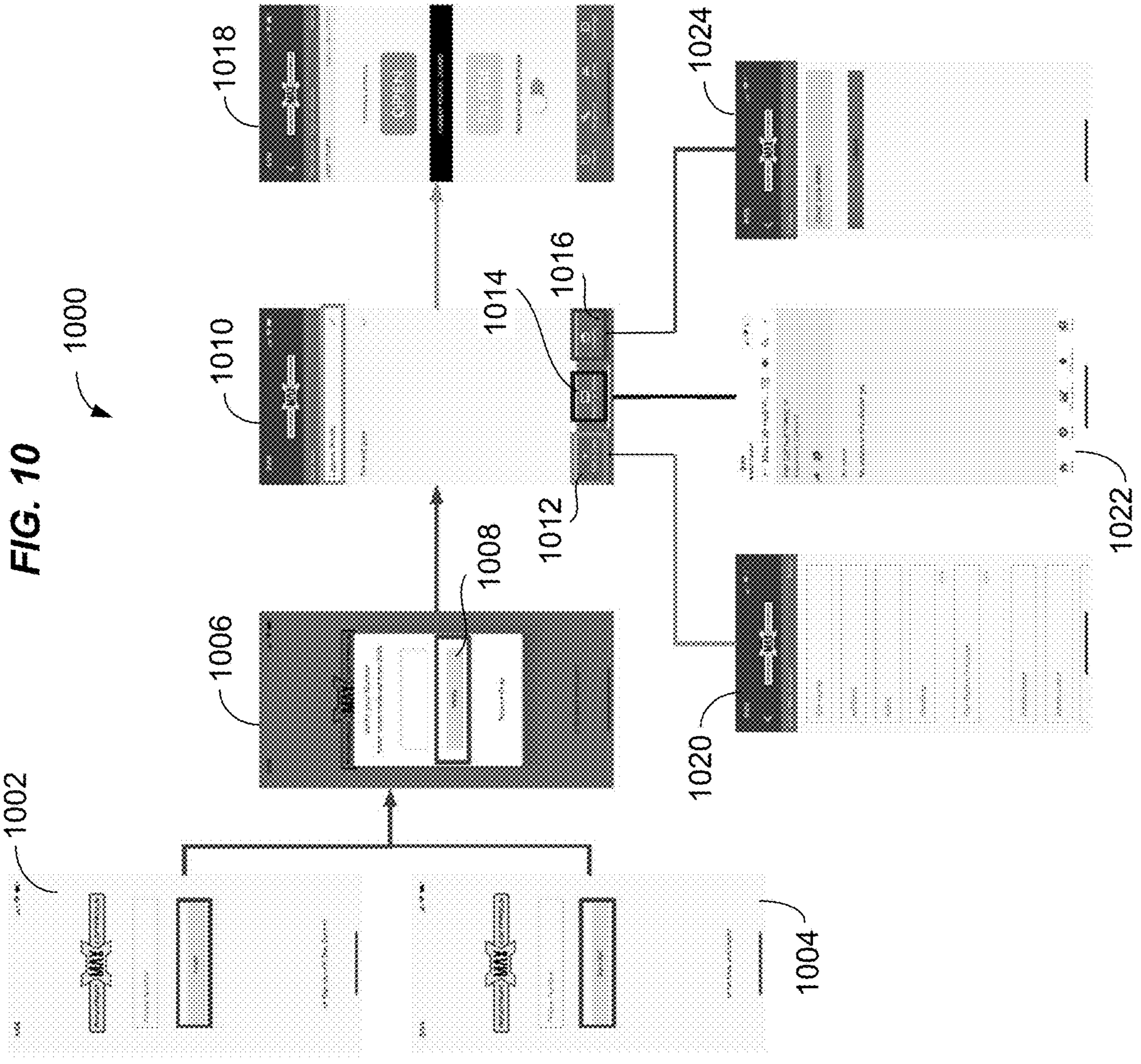
FIG. 10 is a flow chart with exemplary screenshots showing aspects of a method for configuring a system for remote access to a physical facility gated by an electro-mechanical lock.

Referring to FIG. 10, a method 1000 for configuring a system for remote access to a physical facility gated by an electro-mechanical lock may include, by at least one processor of a server and/or client device in communication with the server, presenting an user of the client device with an input screen 1002 for logging into a user account and thereby authenticating the user identity. In an alternative, the at least one processor may present the user with a sign-up screen 1004 for setting up an authenticating a new user.

Next, the at least one processor may execute a $2^{nd}$-factor authentication process as known in the art, which may include sending a verification code to the client device via an independent channel (e.g. an SMS text message) and then providing an authentication screen 1006 including a data entry object 1008 for confirming receipt of the verification code via the session between the client device and server.

Following authentication, the server may provide a site selection screen 1010 from which the authenticated user can pick a physical facility (e.g., "Laguna Woods") protected by one or more electro-mechanical locks under control of the server. The screen 1010 may include at least three options: a first option 1012 for adding a "gate" (e.g., electro-mechanical lock), a second option 1014 for watching an instructional video associated with the facility, or a third option 1016 for setting up a profile of the authenticated user. If the user selects the first option 1012, the server may provide a gate parameter screen 1020 to the client device, including several data input objects that enable user specification of gate parameters, for example an address and/or identifier (IME #) for a controller that controls the electro-mechanical lock, facility name and geographic address, a controller keypad and call button message, and a name and phone number of the administrative user who controls access to the facility. If the user selects the second option 1022, the server may provide a playlist screen 1022 from which the user may view one or more video associated with the facility. This video or these videos can be visible to guests to assist with understanding how to use the guest pass and access system. If the user selects the third option 1024, the server may provide a profile screen 1024 including one or more data input objects enabling the administrative user to set or amend their profile data, for example, smart phone number.

From the facility selection screen 1010, once the user selects a facility, the server may provide a gate control screen 1018, which may be the same or similar to the screen 300 described in connection with FIG. 3.

Figure 11:
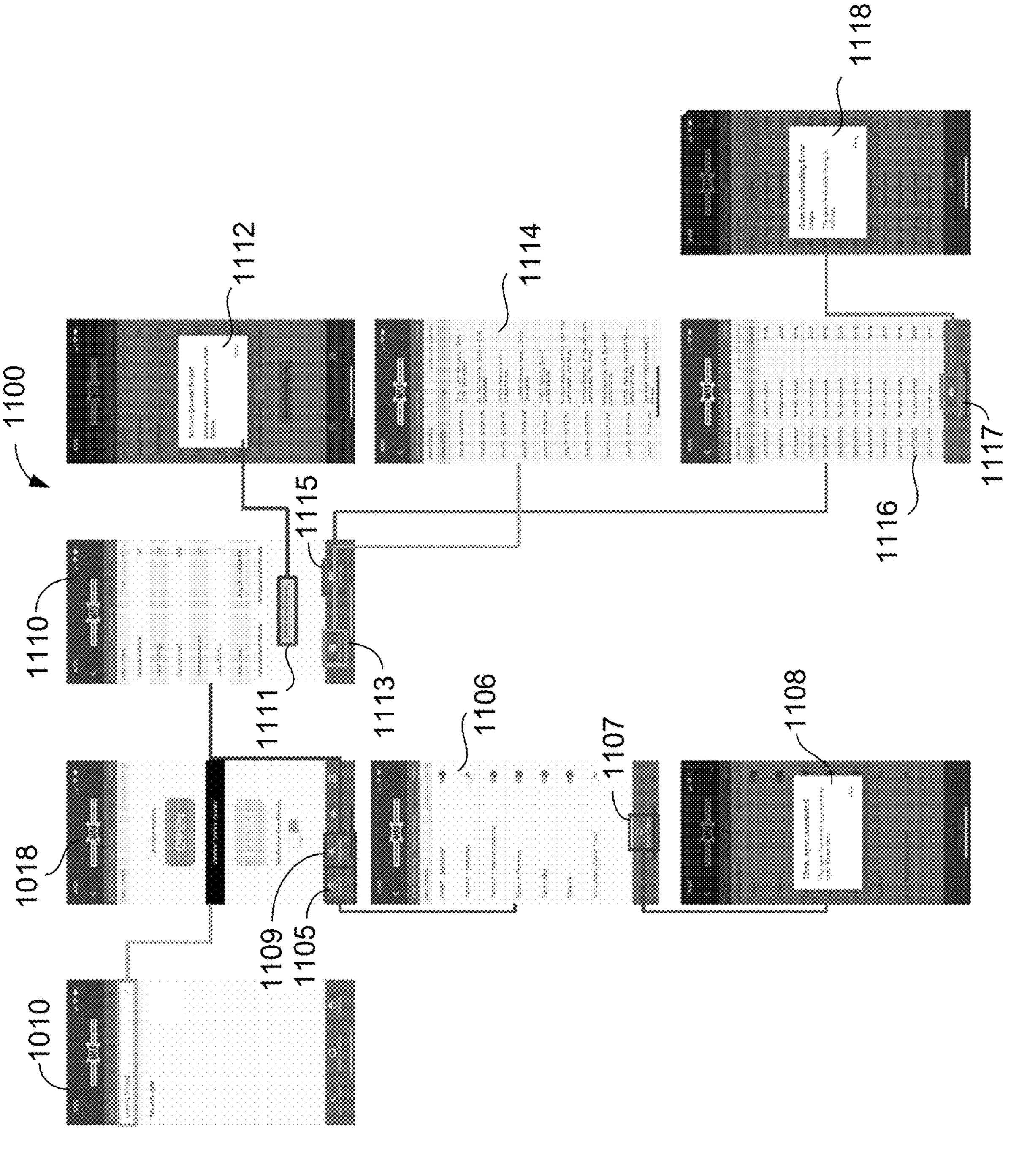
FIG. 11 is a flow chart with exemplary screenshots showing aspects of a method for communicating information to and from a user control application to a controller for an electro-mechanical lock.

Referring to FIG. 11 a method 1100 by at least one processor of a server and/or client device in communication with the server for communicating information to and from a user control application to a controller for an electro-mechanical lock. The method 1100 may begin with presentation of the facility selection screen 1010 and gate control screen 1018, as previously described. The control screen 1018 may include a timer option 1105, which if selected by the user, causes the server to provide a timer screen 1106, from which the user may activate one or more timers each controlling time-of-day and/or day-of-week access for a corresponding guest pass. The timer screen 1106 may include an option 1107 for synchronizing the timers, which if selected by the user, causes the server to request that the controller for the electro-mechanical lock update its time data and provides a confirmation message 1108 to the user.

The control screen 1018 may include another option 1109 for diagnostics, which if selected by the user, causes the server to provide a diagnostics screen 1110 with several data fields showing a current state of the electro-mechanical lock and controller's operating parameters for the selected facility. The state data may be obtained by the server via a hub or keypad controller coupled to an internal data port of the lock controller.

If the controller is jammed with unexecuted actions, the user may select a reset object 1111 causing the server to send a reset command to the controller and send a reset confirmation message 1112 to the user's client device.

The diagnostic screen 1110 may include an option 1113 for requesting an event log from the controller, which if selected by the user, causes the server to send a request to the lock controller or auxiliary data source for the event log, retrieve the event log, generate an event log page 1114 and send the event log page 1114 to the client device for display to the user. For further example, the diagnostic screen 1110 may include an option 1115 for requesting an error log from the controller, which if selected by the user, causes the server to send a request to the lock controller or auxiliary data source for the error log, retrieve the error log, generate an error log page 1115 and send the error log page 1114 to the client device for display to the user. The error log screen 1116 may include a request object 1117 for uploading a copy of the error, which if selected by the user causes the server to upload the error logs and provide a confirmation message 1118.

Figure 12:
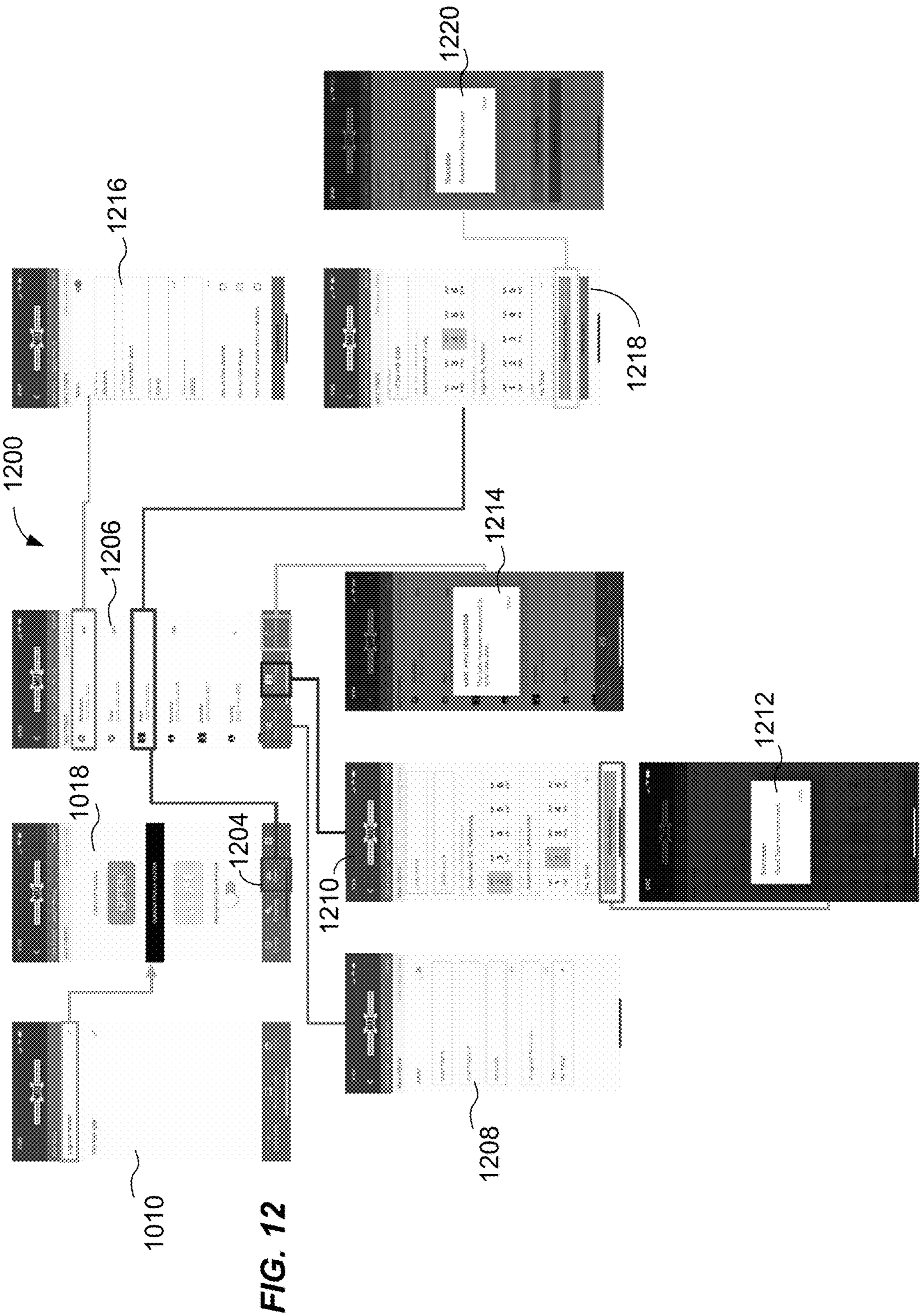
FIG. 12 is a flow chart with exemplary screenshots showing aspects of a method for creating and sending a guest pass for remote access to a physical facility gated by an electro-mechanical lock.

FIG. 12 shows aspects of a method 1200 by at least one processor of a server and/or client device in communication with the server for creating and sending a guest pass for remote access to a physical facility gated by an electro-mechanical lock. The method 1200 may begin with presentation of the facility selection screen 1010 and gate control screen 1018, as previously described. The gate control screen 1018 may include a selection object 1204 for accessing a list of users including guests. When the object 1204 is selected by the user of the client device, the server in response sends a user management page 1206 which lists users and guests and provides options for various user actions. Selecting a regular user (e.g., "Abraham") causes the server to provide a user information page 1216, showing the user's information, including a user name, phone number, one or more keycodes, and options generate text notices in response to various gate events such as, for example, opening or failing to open or close. Selecting a guest user (e.g., "aver") causes the server to send a guest pass review page 1218 including options like those described in connection with screens 500-700 (FIGS. 5-7). Selecting an option to send or resend a guest pass causes the server to resend a link to the online guest pass and issue a confirmation message 1220.

Referring again to the user management screen 1206, selecting the "add a user" option causes the server to provide a new user setup screen 1208 for inputting and confirming the user information as previously described. Picking the "add a guest" option brings up a guest pass configuration page 1210 (see also screen 500, FIG. 5) with data input objects enabling the administrative user to set up a guest pass, including configuring the guest information as previously described. Selecting the "create guest pass" option causes the server to provision a network address with executable code for processing access requests by the pass holder, generating a link to the network address, sending the link in an SMS text message to the guest's smart phone, and providing a confirmation message 1212 to the administrative user's client device. Selecting the "sync users" option causes the server to send current user and guest information to the lock controller and a confirmation message 1214 to the administrative user's client device.

Figure 13:
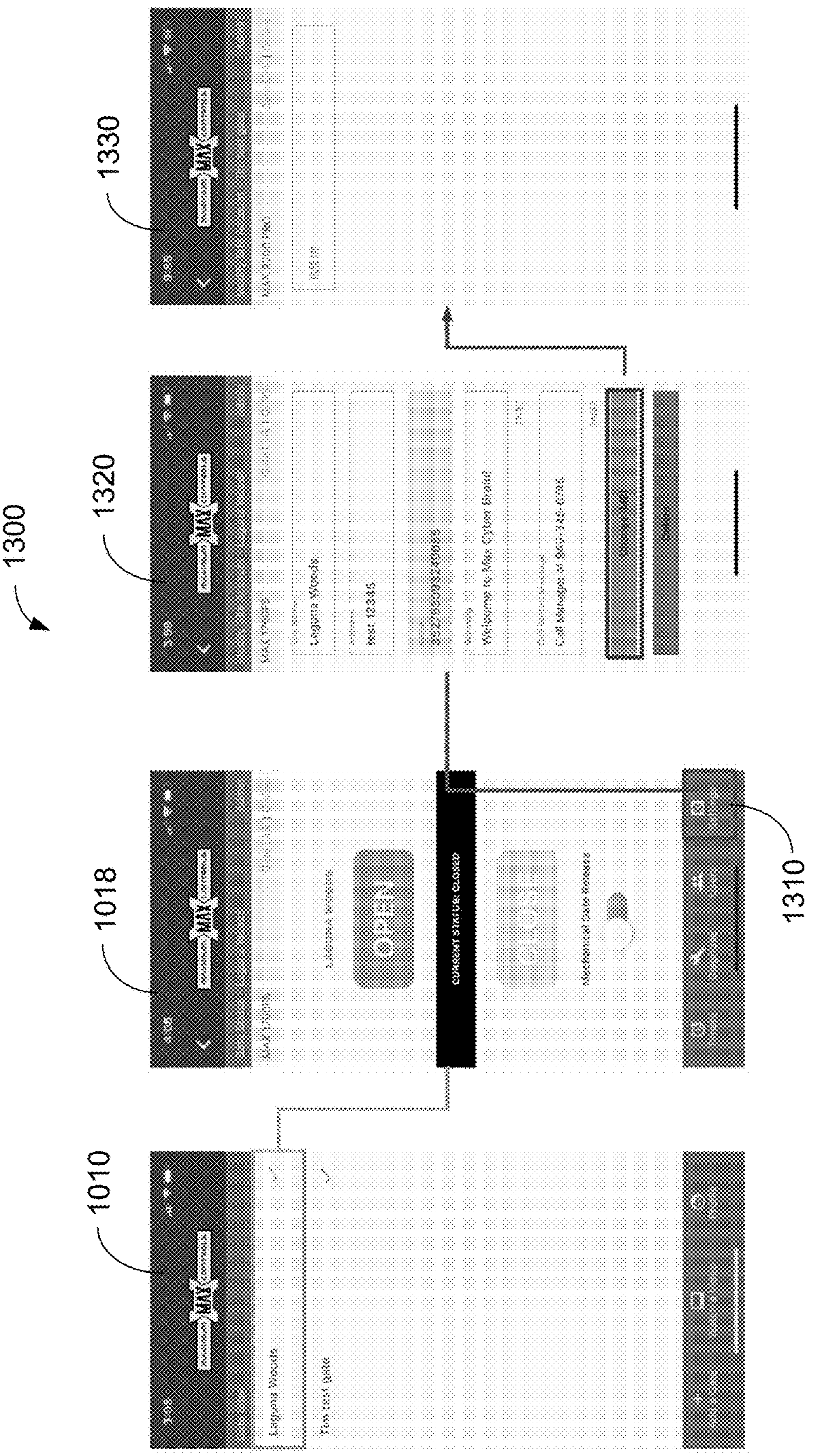

Referring to FIG. 13, a method 1300 by at least one processor of a server and/or client device in communication with the server for assigning or amending an identifier for a controller of an electro-mechanical lock, for use with a guest pass or the like. The method 1300 may begin with presentation of the facility selection screen 1010 and gate control screen 1018, as previously described. The gate control screen 1018 may include a selectable setting object 1310, selection of which causes the server to provide to the client device a lock controller setup screen 1320, containing data entry objects for setting parameters of (for example) the "Laguna Woods" facility lock. Parameters may include, for example, a site name and geographical address, a unique identifier (IME#) and for the gate, a greeting message for presenting on a display of the gate lock, if applicable, and a call message for display for keypad controllers equipped with the call button feature. In response to user selection of the "change IME#" option, server provides a screen 1330 for changing the IME number, and may be needed when upgrading or changing the lock controller hardware. In an aspect, the IME# uniquely identifies the control circuit for the facility's electro-mechanical lock and may serve as an address or access key. When the hardware is changed, the screen 1330 and method 1300 may be used to change the IME# accordingly.

Figure 14:
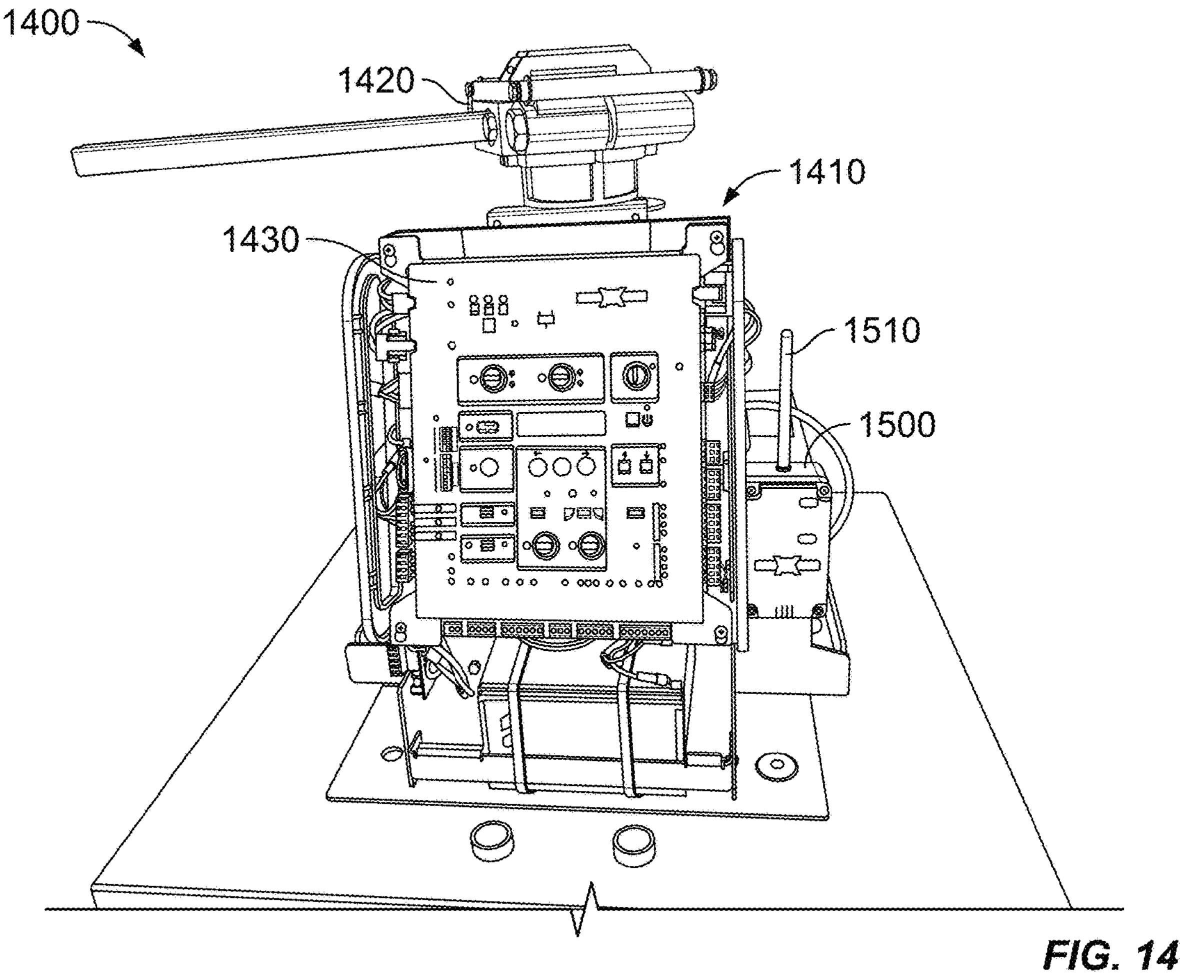
FIG. 14 is a perspective view showing a controller for an electro-mechanical lock coupled to a transceiver hub for communicating with a server running a web application for gate access.
Figure 15:
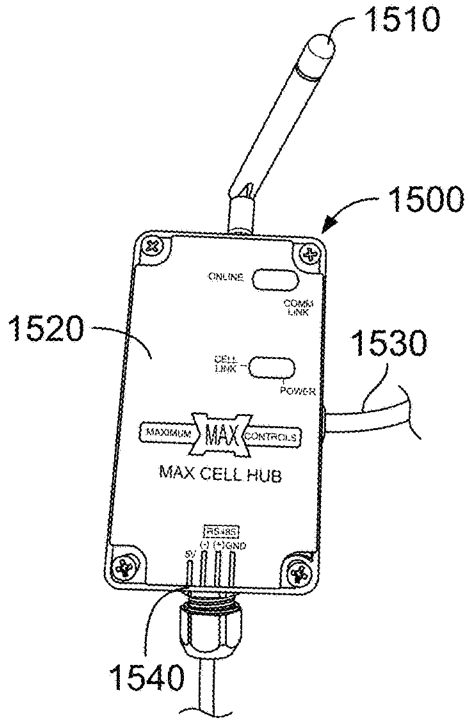
FIG. 15 is a perspective view showing a transceiver hub for communicating with a server running a web application for gate access.
Figure 16:
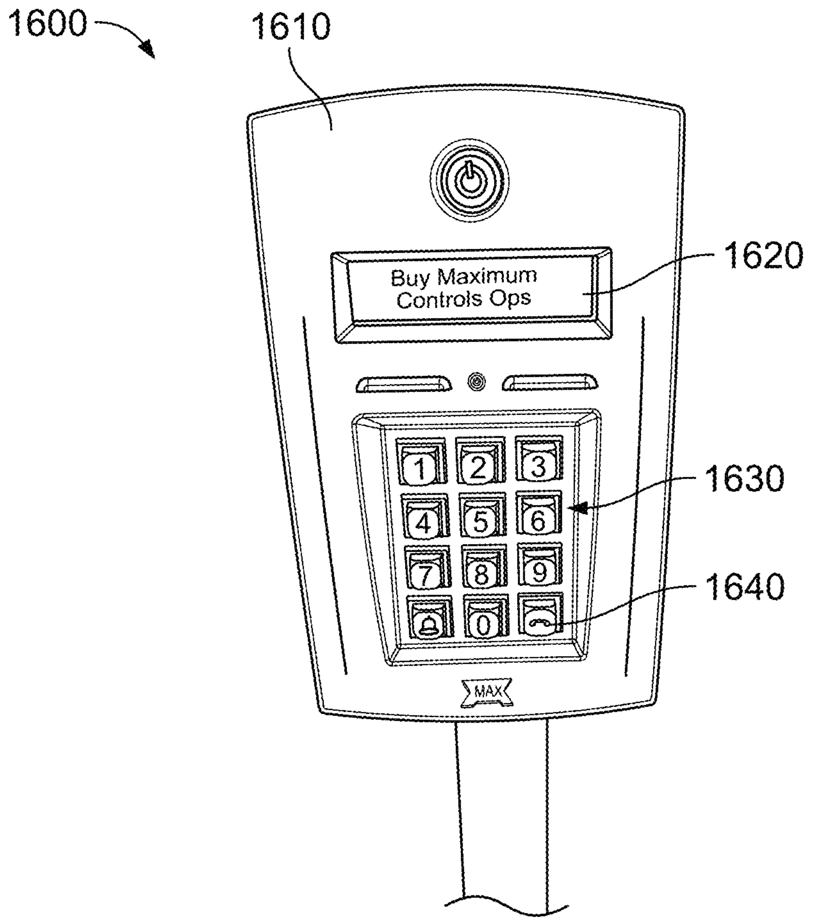
FIG. 16 is a perspective view showing a transceiver hub for a keypad controller for use with a remote access system.

FIGS. 14-16 provide views of hardware used for facility electro-mechanical locks, including gate controllers and actuators, hubs, and keypad controllers. As shown in FIG. 14, an electro-mechanical lock 1400 may include a controller 1410 coupled to an actuator 1420 for opening, closing, and/or unlocking a gate or door. The actuator 1420 may be configured for swinging, sliding, rolling, or other opening/closing action. The controller 1410 may be coupled to a user interface panel 1430 and may include at least one processor coupled to a memory holding program instructions, with other circuitry and components as needed to drive the actuator, and at least one data port (e.g., a serial port) for coupling the an external module. The controller 1410 may be coupled to a transceiver hub 1500 for communicating with a server running a web application for gate access.

The transceiver hub 1500 as shown in FIG. 15 is configured for communicating with a server running a web application for gate access, with at least one user interface panel 1520 forming part of a metallic housing that encloses the hub's electronics. A wireless antenna 1510 is coupled to the internal electronics for receiving and sending data over a cellular telephony network to the remote server via an internal transceiver. The internal electronics may include a processor and memory as described in connection with FIG. 2. The hub 1500 may include a serial port 1540 for coupling to the controller 1410 of the electro-mechanical lock 1400, for sending and receiving data and commands between the controller 1410 and remote server, wherein the hub acts as a relay and/or router/modem. While an RS483 port 1540 is illustrated, any suitable connection to the controller 1410 may be used. In an alternative, or in addition, the hub electronics may include a second wireless transceiver for short-range communication with the controller 1410 and/or with any smart phone or the like authorized by a guest pass or regular user, to verify proximity.

Instead of or in addition to the transceiver hub 1500, a system may use a keypad controller 1600 to facilitate remote access to the lock controller 1410 by a remote server and/or manual local access via a keypad 1630, as shown in FIG. 16. The keypad controller 1600 may be coupled to the controller 1410 or to the hub 1500 via a wired or wireless connection. In alternative embodiments, the keypad controller may include a cellular wireless interface for connecting to a remote server. The keypad controller 1600 may include a housing 1610, a display 1620, keypad 1630 or other suitable user interface, and internal electronics as shown and described in connection with FIG. 2.

In an aspect, the keypad 1630 may include a call button 1640 configured for a controller 1600 that lacks a telephone connection. Instead of dialing a number directly, when the call button is selected, the keypad controller displays the message set by the administrative user, for example using a "call button message" data entry field as shown in FIG. 13 in screen 1320. Setting this message causes the server to send the message to a hub component, which may be coupled to the keypad controller 1600 via a wired or wireless connection. Thus, the hub may relay the message content to the keypad controller, which saves in in a display register associated with the call button 1640. Thus, when a user who lacks a guest pass or regular user status is at the keypad seeking entry presses the call button 1640, the keypad controller 1600 causes a message such as, for example, "Call manager at 555-555-5555" to appear on the display 1620. Following the instructions, the visitor can call the manager using their own portable phone, who may admit the visitor if desired by activating an "open" command object via the server, for example by activating the "open" object 302 as shown in FIG. 3. The server then instructs the hub, which relays the command to the lock controller, which opens the gate. Thus, the system can be used to admit a one-time visitor lacking a pre-arranged guest pass to a physical facility without needing to provide the keypad controller 1600 with a telephone connection, thereby avoiding telephone service fees.

Figure 21:
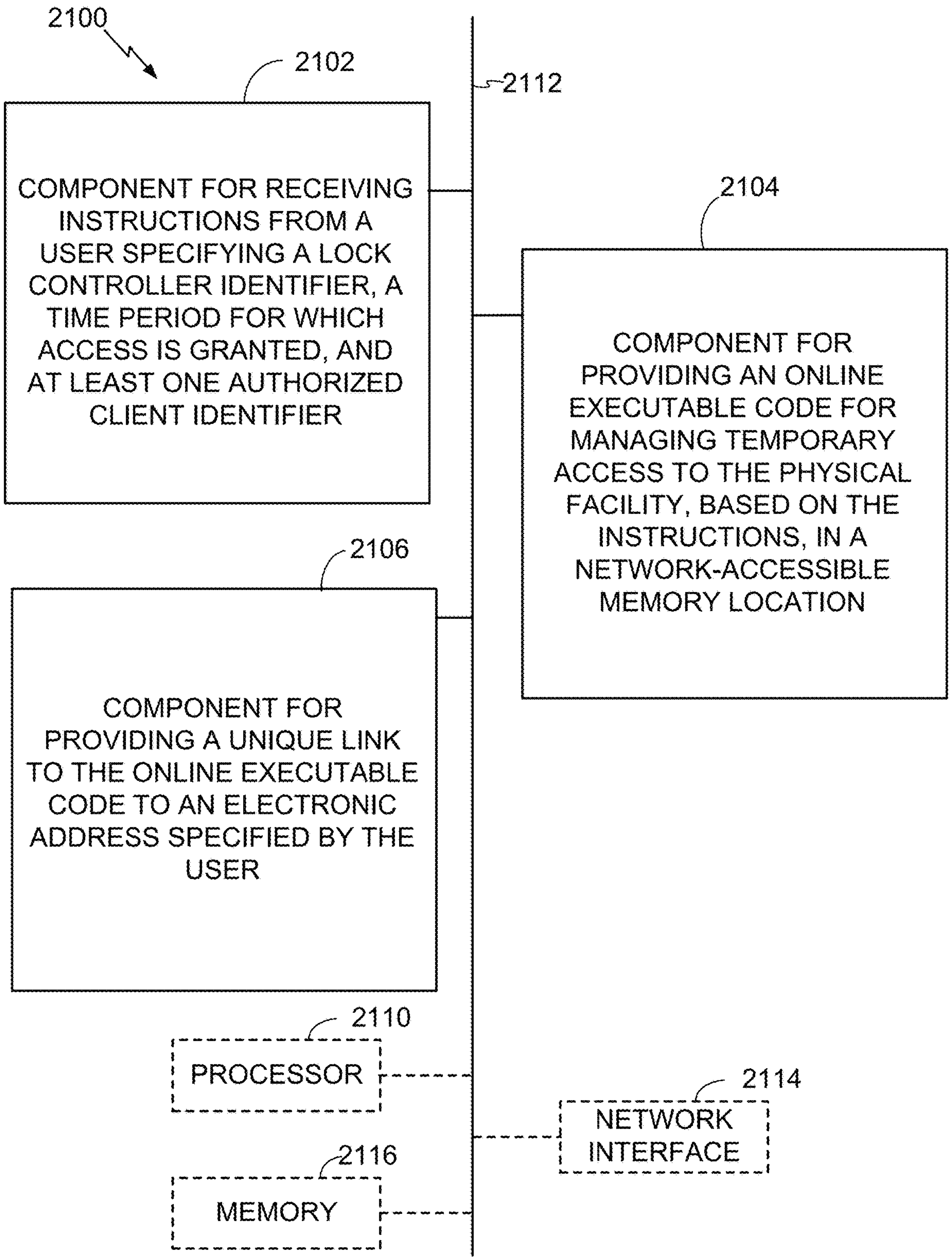
FIG. 21 is a block diagram illustrating aspects of an apparatus for remote access to a physical facility gated by an electro-mechanical lock.

FIG. 21 is a block diagram illustrating aspects of an apparatus for remote access to a physical facility gated by an electro-mechanical lock.

Figure 17:
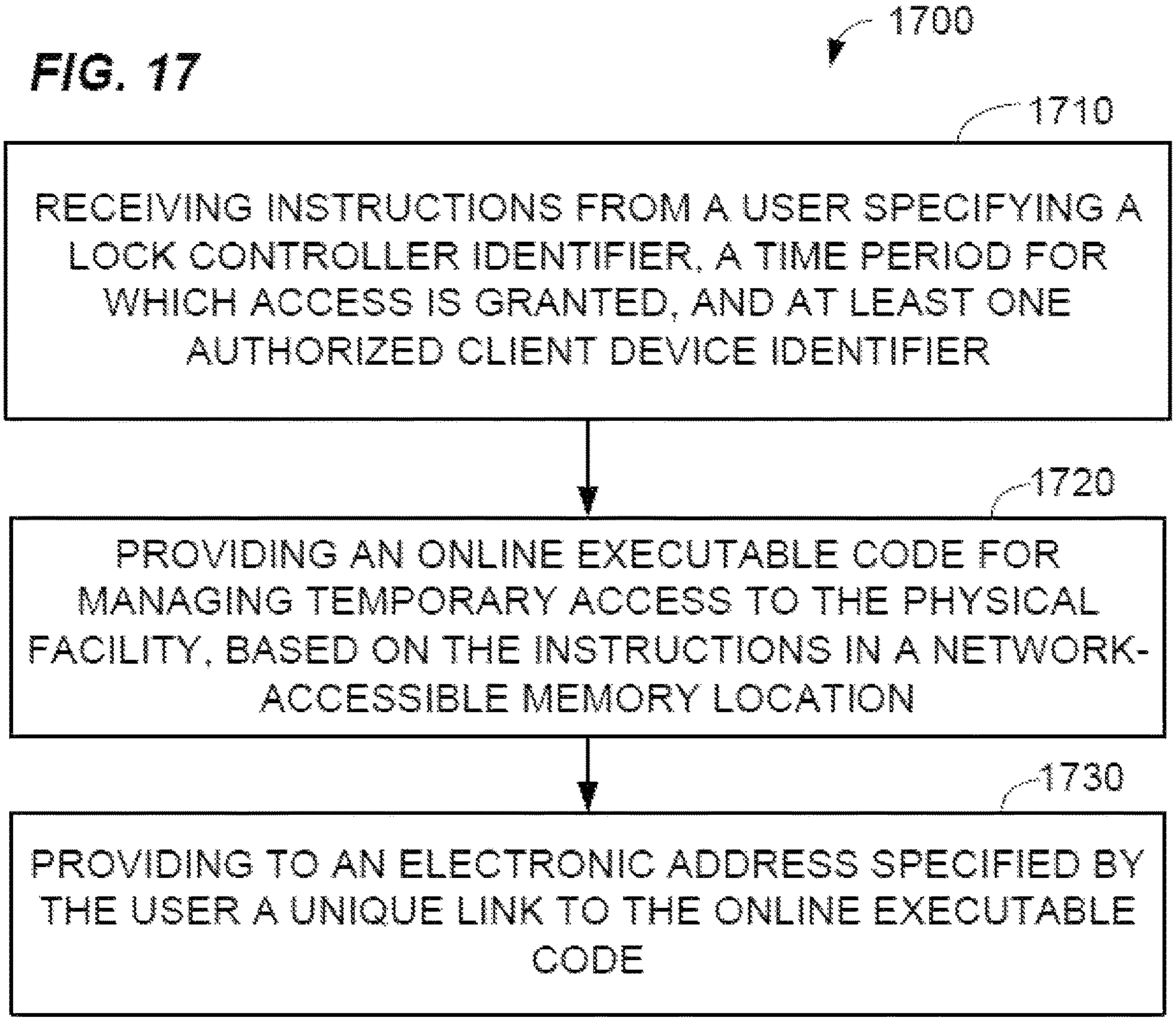
FIG. 17 is a flow chart illustrating operations of a method for remote access to a physical facility gated by an electro-mechanical lock.
Figure 18:
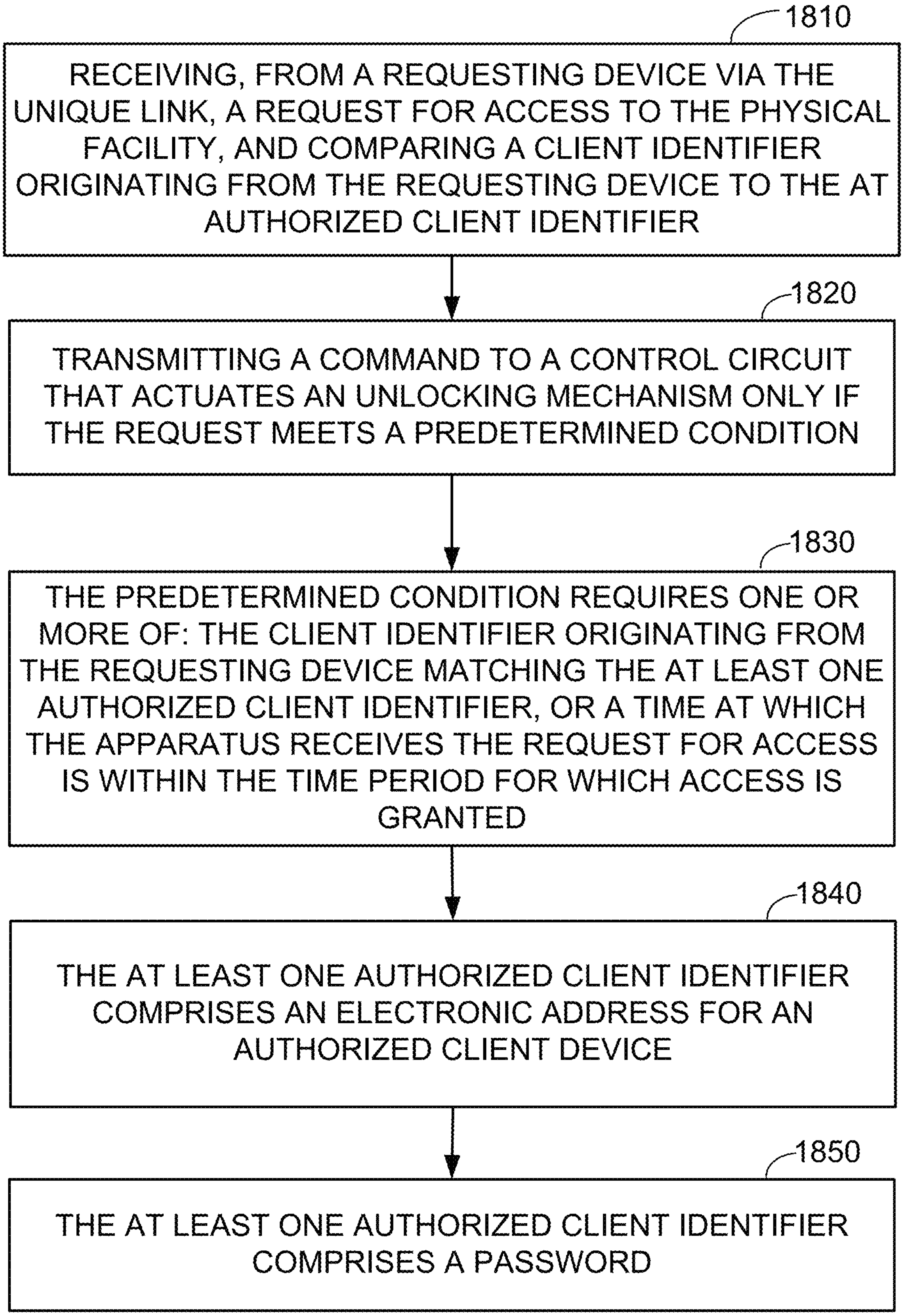
FIGS. 18-20 are flow charts illustrating further optional operations of a method for remote access to a physical facility gated by an electro-mechanical lock.

In accordance with the foregoing, and by way of additional example, FIG. 17 shows more general aspects of a method or methods 1700 for remote access to a physical facility gated by an electro-mechanical lock according to one embodiment, as may be performed by a server 106, alone, or with other components of a system 100 as described herein. It should be appreciated that the more general operations of method 1700 may include or embody more detailed aspects of corresponding methods described herein above and below.

Referring to FIG. 17, a computer-implemented method 1700 for remote access to a physical facility gated by an electro-mechanical lock may include, at 1710, receiving by at least one processor over a computer network instructions from a user specifying a lock controller identifier, a time period for which access is granted, and at least one authorized client device identifier. The data may be received from a client device of an authorized administrative user, for example using a screen 1210 as shown in FIG. 12 and/or screen 500 shown in FIG. 5. The method 1700 may further include at 1720 providing, by the at least one processor, an online executable code 121 (FIG. 1) for managing temporary access to the physical facility, based on the instructions, in a network-accessible memory location. The method 1700 may further include at 1730 providing, by the at least one processor to an electronic address specified by the user, a unique link 122 (FIG. 1) to the online executable code.

The address may be, for example, a phone number for a smart phone used by the guest, who can receive the link as an SMS text or similar message. The link is operative to access the online executable code via a web browser operating on a smartphone or the like. When at the facility gate, the guest requests access to the gate via the link, which connects to executable code hosted by a computer on the Internet or equivalent computer network. The executable code authenticates the guest identity and permitted times of access. If the request meets all access criteria, the online executable code causes an access command (e.g., command to unlock and/or open) to be sent to the electromechanical lock via a network interface. The network interface, also called a "hub" herein, may be a modular electronic unit that can be connected to any electromechanical lock having a serial port, or equivalent input/output port.

The method 1700 may include any one or more additional operations as described above and below herein, for example, one or more of the additional operations 1800, 1900, or 2000. Each of these additional operations is not necessarily performed in every embodiment of the method, and the presence of any one of the operations does not necessarily require that any other of these additional operations also be performed.

For example, optionally, method 1700 may further include at 1810 receiving, from a requesting device via the unique link, a request for access to the physical facility, and comparing a client identifier originating from the requesting device to the at least one authorized client identifier. The method 1700 may further include, at 1820, transmitting a command to a control circuit that actuates an unlocking mechanism of the electro-mechanical lock only if the request meets a predetermined condition. The predetermined condition may include any suitable identity or time constraints. For example, as shown at block 1830, the predetermined condition may require one or more of the client identifier originating from the requesting device matching the at least one authorized client identifier, or a time at which the apparatus receives the request for access is within the time period for which access is granted.

In some embodiments, as shown at block 1840, the at least one authorized client identifier may be, or may include, an electronic address for an authorized client device, for example, a unique telephone number or Internet address. In addition, or in an alternative, as shown at block 1850 the at least one authorized client identifier may be, or may include, a password or electronic identity token, with or without an account identifier.

Figure 19:
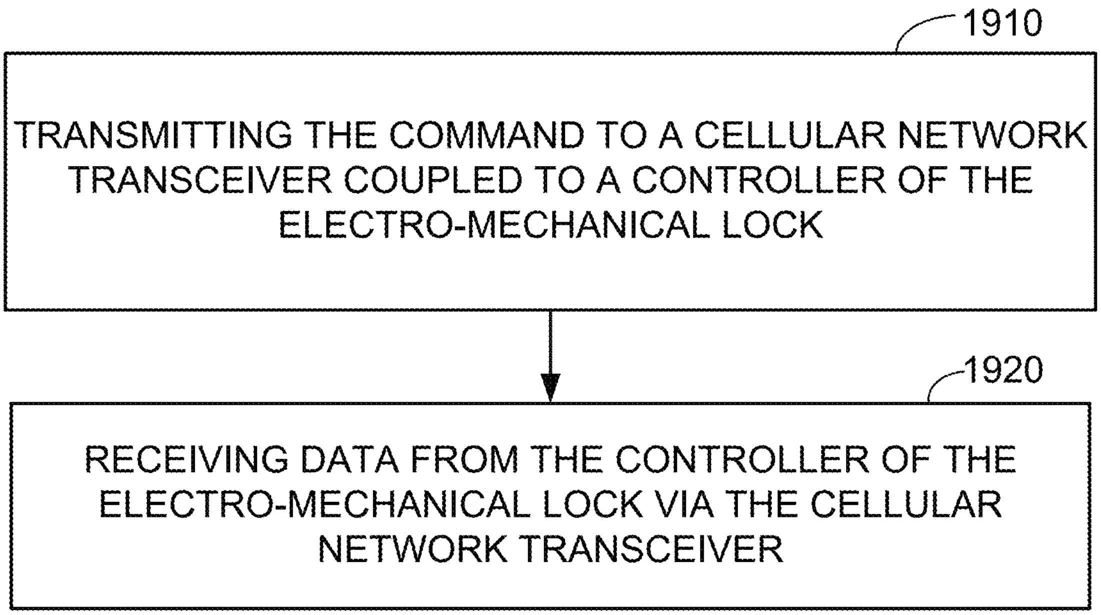

In another aspect referring to FIG. 19, the method 1700 may include at 1910 transmitting the command to a cellular network transceiver (e.g., the hub) coupled to a controller of the electro-mechanical lock. In some embodiments, the method 1700 may include at 1920 receiving data from the controller of the electro-mechanical lock via the cellular network transceiver. Thus, for example, a user may be able to check operational status of the electro-mechanical lock controller without a visit to the physical facility, such as in the examples provided in connection with FIG. 11.

Figure 20:
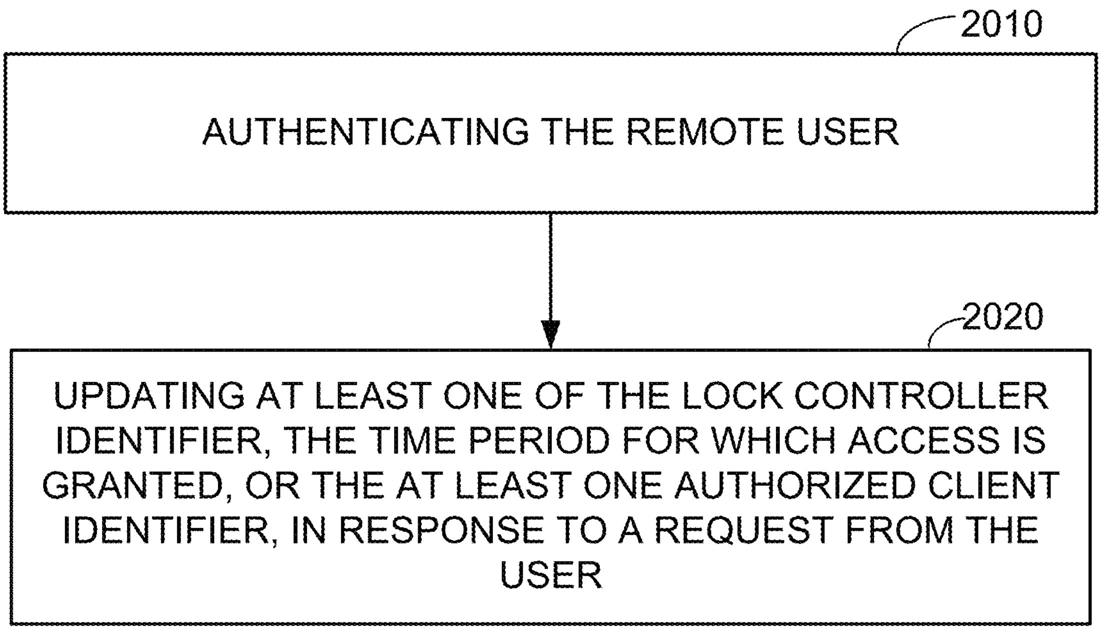

In another aspect referring to FIG. 20, the method 1700 may include at 2010 authenticating the remote user who sets up the guest pass online, for example, using a username and password, with or without 2-factor authentication. Authentication should be secure enough to prevent issuance of unauthorized guest passes. In addition, users should be able to cancel or amend guest passes, for example by changing the access period or adding/removing guest users. Accordingly, the method 1700 may include at 2020 updating at least one of the lock controller identifier, the time period for which access is granted, or the at least one authorized client identifier, in response to a request from the user.

FIG. 21 is a conceptual block diagram illustrating components of an apparatus or system 2100 for remote access to a physical facility gated by an electro-mechanical lock as described herein, according to one embodiment. As depicted, the apparatus or system 21 may include functional blocks that can represent functions implemented by a processor, software, or combination thereof (e.g., firmware).

As illustrated in FIG. 21, the apparatus or system 2100 may comprise an electrical component 2102 for receiving instructions from a user specifying a lock controller identifier, a time period for which access is granted, and at least one authorized client identifier. The component 2102 may be, or may include, a means for said receiving. Said means may include the processor 2110 coupled to the memory 2116, and to the network interface 2114, the processor executing an algorithm based on program instructions stored in the memory. Such algorithm may include a sequence of more detailed operations, for example, operations as described in connection with screens 1206, 1210 and 1214 of FIG. 12, and lower level operations by a communication protocol used between the client device and server.

The apparatus or system 2100 may further comprise an electrical component 2104 for providing an online executable code for managing temporary access to the physical facility, based on the instructions, in a network-accessible memory location. The component 2104 may be, or may include, a means for said providing. Said means may include the processor 2110 coupled to the memory 2116, and to the network interface 2114, the processor executing an algorithm based on program instructions stored in the memory. Such algorithm may include a sequence of more detailed operations, for example, provisioning a memory location with parameters for a guest pass as described, and setting up executable code configured for initiating a guest interaction routine based on the parameters at a memory location with a network address.

The apparatus or system 2100 may further comprise an electrical component 2106 for providing a unique link to the online executable code to an electronic address specified by the user. The component 2106 may be, or may include, a means for said providing. Said means may include the processor 2110 coupled to the memory 2116, and to the network interface 2114, the processor executing an algorithm based on program instructions stored in the memory. Such algorithm may include a sequence of more detailed operations, for example, placing the network address in a message, and sending the message to the client device in use by the administrative user.

The apparatus 2100 may optionally include a processor module 2110 having at least one processor, in the case of the apparatus 2100 configured as a data processor. The processor 2110, in such case, may be in operative communication with the modules 2102-2106 via a bus 2112 or other communication coupling, for example, a network. The processor 2110 may effect initiation and scheduling of the processes or functions performed by electrical components 2102-2106.

In related aspects, the apparatus 2100 may include a network interface module 2114 operable for communicating with a storage device over a computer network. In further related aspects, the apparatus 2100 may optionally include a module for storing information, such as, for example, a memory device/module 2116. The computer readable medium or the memory module 2116 may be operatively coupled to the other components of the apparatus 2100 via the bus 2112 or the like. The memory module 2116 may be adapted to store computer readable instructions and data for effecting the processes and behavior of the modules 2102-2106, and subcomponents thereof, or the processor 2110, or the method 1700 and one or more of the additional operations 1800, 1900, or 2000 described in connection with the method 1700. The memory module 2116 may retain instructions for executing functions associated with the modules 2102-2106. While shown as being external to the memory 2116, it is to be understood that the modules 2102-2106 can exist within the memory 2116.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ) smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for remote access to a physical facility gated by an electro-mechanical lock, comprising:

a network interface; and at least one processor coupled to a memory and to the network interface, the memory holding program instructions that when executed by the at least one processor, cause the apparatus to perform:

receiving instructions from a user specifying conditions for access to the physical facility by a specified quest, the conditions for access comprising a lock controller identifier for the electro-mechanical lock, a time period for which access is granted, and at least one authorized client identifier identifying a requesting device belonging to the specified quest;

generating a unique link to a network-accessible memory location for the specified guest;

providing an online executable code in the network-accessible memory location specified by the unique link, the executable code for processing access requests by the specified quest and configured to enable the requesting device to activate temporary access to the physical facility based on the instructions, wherein the online executable code is operative to send a command to a control circuit that actuates an unlocking mechanism of the electro-mechanical lock in response to a request meeting the conditions for access made by selecting the unique link using the requesting device, without requiring an access token or key from the quest; and sending the unique link to the online executable code to an electronic address for the guest specified by the user.

2. The apparatus of claim 1, wherein the memory holds further instructions for receiving, from the requesting device via the unique link, a request for access to the physical facility;

detecting, by the online executable code, a client identifier of the requesting device; and comparing the client identifier of the requesting device to the at least one authorized client identifier.

3. The apparatus of claim 2, wherein the memory holds further instructions for transmitting the command to a control circuit that actuates the unlocking mechanism only if the request meets the conditions for access.

4. The apparatus of claim 3, wherein the conditions for access requires that the client identifier originating from the requesting device matches the at least one authorized client identifier and a time at which the apparatus receives the request for access is within the time period for which access is granted.

5. The apparatus of claim 2, wherein the memory holds further instructions for the comparing wherein the at least one authorized client identifier comprises an electronic address for an authorized client device.

6. The apparatus of claim 1, wherein the memory holds further instructions for transmitting the command to a cellular network transceiver coupled to a controller of the electro-mechanical lock.

7. The apparatus of claim 6, wherein the memory holds further instructions for receiving data from the controller of the electro-mechanical lock via the cellular network transceiver.

8. The apparatus of claim 1, wherein the memory holds further instructions for authenticating a user of the requesting device.

9. The apparatus of claim 8, wherein the memory holds further instructions for updating at least one of the lock controller identifier, the time period for which access is granted, or the at least one authorized client identifier, in response to a request from the user.

10. A method for controlling remote access to a physical facility gated by an electro-mechanical lock, the method comprising:

receiving, by at least one processor over a computer network, instructions from a user specifying conditions for access to the physical facility by a specified guest, the conditions for access comprising a lock controller identifier for the electro-mechanical lock, a time period for which access is granted, and at least one authorized client device identifier for identifying a requesting device belonging to the specified quest;

generating a unique link to a network-accessible memory location for the specified guest;

providing, by the at least one processor, an online executable code in the network-accessible memory location specified by the unique link, the executable code for processing access requests by the specified guest and configured to enable the requesting device to activate temporary access to the physical facility based on the instructions, wherein the online executable code is operative to send a command to a control circuit that actuates an unlocking mechanism of the electro-mechanical lock in response to a request meeting the conditions for access made by selecting the unique link using the requesting device without requiring an access token or key from the guest; and sending, by the at least one processor, the unique link to an electronic address for the guest specified by the user.

11. The method of claim 10, further comprising receiving, from the requesting device via the unique link, a request for access to the physical facility;

detecting, by the online executable code, a client identifier of the requesting device; and comparing the client identifier of the requesting device to the at least one authorized client identifier.

12. The method of claim 11, further comprising transmitting the command to a control circuit that actuates an the unlocking mechanism only if the request meets the conditions for access.

13. The method of claim 12, wherein the conditions for access requires that the client identifier originating from the requesting device matches the at least one authorized client identifier and a time at which the apparatus receives the request for access is within the time period for which access is granted.

14. The method of claim 11, wherein the at least one authorized client identifier comprises an electronic address for an authorized client device.

15. The method of claim 10, further comprising transmitting the command to a cellular network transceiver coupled to a controller of the electro-mechanical lock.

16. The method of claim 15, further comprising receiving data from the controller of the electro-mechanical lock via the cellular network transceiver.

17. The method of claim 10, further comprising authenticating a user of the requesting device.

18. The method of claim 10, further comprising updating at least one of the lock controller identifier, the time period for which access is granted, or the at least one authorized client identifier, in response to a request from the user.

* * * * *